3,457,050
PREPARATION OF $B_{10}H_{10}^=$ ANION
John C. Sauer, Wilmington, Del., assignor to E. I. du Pont de Nemours and Company, Wilmington, Del., a corporation of Delaware
No Drawing. Filed Feb. 27, 1964, Ser. No. 347,691
Int. Cl. C01b 6/10; C07f 5/02
U.S. Cl. 23—362                              7 Claims

ABSTRACT OF THE DISCLOSURE

The $B_{10}H_{10}^=$ anion can be prepared by reacting diborane with a metal aluminum hydride and a Lewis base.

DESCRIPTION OF THE INVENTION

This invention relates to a new process for preparing the $B_{10}H_{10}^=$, or decahydrodecaborate(2-), anion.

The recent synthesis of the surprisingly stable $B_{10}H_{10}^=$ anion, together with the discovery of the scope of its chemistry and the uses of the many compounds containing it (Knoth et al., J. Am. Chem. Soc. 84, 1056 (1962)), attests to the desirability of preparing the $B_{10}H_{10}^=$ anion through an inexpensive, easy route. Up to now the only known syntheses of the $B_{10}H_{10}^=$ anion have been based on decaborane, a relatively expensive starting material. Accordingly, it is an object of this invention to provide a direct synthesis of $B_{10}H_{10}^=$ from more readily available, lower-molecular-weight boron hydrides. It is another object to prepare $B_{10}H_{10}^=$ anions directly from $B_2H_6$ in a one-step process. These and other objects will become apparent hereinafter.

In the present invention, the $B_{10}H_{10}^=$ anion can be prepared directly from diborane, $B_2H_6$, by reacting diborane with an alkali-metal aluminum hydride or an alkaline-earth-metal aluminum hydride in the presence of a tertiary amine, a tertiary phosphine, or an organic sulfide.

The alkali-metal aluminum hydrides and alkaline-earth-metal aluminum hydrides are salts composed of the cations of the metals of Groups I–A and II–A of the Periodic Table, and the $AlH_4^-$ anion. The Periodic Table referred to is that in Deming's "General Chemistry," Fifth Edition, p. 156 (Wiley, 1944). The alkali-metal aluminum hydrides, particularly lithium aluminum hydride, are preferred because of their availability. Use of an alkali-metal aluminum hydride or an alkaline-earth-metal aluminum hydride is an essential feature of the process. In the absence of such a compound, and even in the presence of another type of metal hydride, no $B_{10}H_{10}^=$ is formed.

The amines, phosphines, and thio ethers operable in the process are Lewis bases, and as such are capable of forming borane adducts by reaction with diborane. Because of their degree of basicity toward diborane and the absence of side reactions when they are used, preferred Lewis bases are those tertiary amines, tertiary phosphines, and organic sulfides (a) which contain only carbon and hydrogen in addition to the nitrogen, phosphorus, or sulfur, (b) in which any unsaturation in the hydrocarbon portions is aromatic, i.e., free of aliphatic unsaturation, and (c) in which there is at most one aryl group bonded to any one nitrogen. Compounds, including those just described, in which any carbon-carbon unsaturation is aromatic are frequently referred to as aliphatically saturated.

Because of availability, a more preferred class of Lewis bases are those represented by the formulas (1) $R_3N$,
(2) $R_3P$, and
(3) $R_2S$ wherein the R's are the same or different and are aliphatically saturated hydrocarbyl groups of at most 12 carbons, wherein any two R's can be joined together to form a divalent aliphatically saturated hydrocarbyl radical of at most 12 carbons, and wherein at most one aryl group is bonded to nitrogen. The types of aliphatically saturated hydrocarbyl groups that can be present in the compounds of Formulas 1, 2, and 3 include alkyl, cycloalkyl, alkylcycloalkyl, cycloalkylalkyl, aryl, alkaryl, aralkyl, cycloalkylaryl, arylcycloalkyl, alkylene, and the like. Specific examples of operable Lewis bases are trioctylamine, cyclohexylmethyl(diisobutyl)amine, benzyldodecylethylamine, dimethylaniline, 1-methylpiperidine, cyclopentyldiethylphosphine, tri($\alpha$-naphthyl)phosphine, cyclohexylphenyl(dimethyl)phosphine, phenyl(tetramethylene) phosphine, di(methylcyclohexyl) sulfide, ethyl p-tolyl sulfide, phenylcyclopentyl methyl sulfide, and tetrahydrothiophene.

The most preferred Lewis bases are compounds of Formulas 1, 2 and 3 in which the R groups are lower alkyl, particularly the tri(lower alkyl)amines.

The ratio of the three reactants is not critical. Usually roughly equivalent quantities of the metal aluminum hydride and the Lewis base and an excess of diborane are used. However, the hydride/Lewis base mole ratio can vary widely, and can be anywhere between about 10/1 and 1/10 or even beyond these limits. When the reactants are mixed, the initial reaction, even at temperatures as low as about 0° C., is the reversible formation of a Lewis base·borane adduct according to the following equation:

(4) 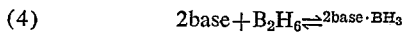

Normally an excess of diborane over the amount required for this adduct formation is used; the molar excess is usually between about 10% and 1000% and can be even greater. If desired for any reason, the base·$BH_3$ adduct can be isolated beforehand and supplied to the reaction mixture as such. No particular advantage results, however.

A solvent or diluent is not required and is usually not employed. However, an inert solvent or diluent such as benzene or heptane can be used.

The process can be conducted over a wide range of temperatures. The reaction does not proceed fast enough for practical purposes below about 140° C., and there is no particular advantage to be gained by operating above about 200° C. The temperature is usually therefore between these limits, the range 160–200° C. being especially preferred.

The time can also vary widely and can be as short as a few minutes or as long as 24 hours or more. Usually the time is at least one hour and not more than about 12 hours.

Pressure is not critical; the process can be conducted at superatmospheric, atmospheric or subatmospheric pressure. It is most conveniently carried out at the autogenous pressure of the reactants in a closed system.

The $B_{10}H_{10}^=$ anion produced by the reaction exists, of course, in the reaction mixture in its ionic form. The cation necessary to maintain the reaction mixture in an electrically neutral state may be supplied from a number of sources. For example, the cation may be the alkali metal or alkaline earth metal cation, or it may be hydrogen, aluminum or a cation derived from the Lewis base, e.g., $R_3NH^+$.

The products can be isolated by conventional methods familiar to those skilled in the art of polyhydropolyborate chemistry. For example, when the Lewis base is a tri-(lower alkyl)amine, after removal of hydrogen and other volatile reactive materials, relatively reactive boron hydride compounds present can be decomposed by treatment with a lower alkanol such as methanol or ethyl alcohol. The $B_{10}H_{10}^=$ anion remains unchanged and in solution. Following removal of insoluble materials, it can be isolated by selective precipitation with any precipitating cation, as for example, cesium cation.

If the Lewis base contains a long-chain alkyl group, the $B_{10}H_{10}^=$ may end up in an insoluble salt, the cation of which is derived from the Lewis base. Such a salt would be among the insoluble materials resulting from the treatment of the reaction mixture with methanol or ethyl alcohol. The $B_{10}H_{10}^=$ anion can be brought into solution by treatment of such a salt with a strong acid such as hydrochloric acid.

Optionally, the metal aluminum hydride can be formed in the reaction mixture from a metal borohydride and aluminum chloride, aluminum bromide, or aluminum iodide. In this embodiment, the aluminum halide, metal borohydride, Lewis base, and diborane are charged to the reaction vessel and processed as described above.

The following examples illustrate the process of the invention:

EXAMPLE 1

A silver-lined shaker tube was charged with 10 g. of lithium aluminum hydride and 50 ml. of triethylamine, cooled to about −60° C. in acetone/solid carbon dioxide, evacuated to about 1.0 mm. pressure, and charged additionally with 28 g. of diborane. The tube was then heated at 180° C. and autogenous pressure with shaking for 10 hours, cooled, and opened. After removal of volatile materials at room temperature and atmospheric pressure, the remaining product was mixed thoroughly with 200 ml. of methanol. Liberation of a gas was observed. The mixture of solid and liquid that resulted was separated by filtration, and the filtrate was concentrated to a crystalline mush by evaporation at about 25° C. and 300 mm. The residue was dissolved in excess aqueous 50% cesium fluoride solution, and the solid that precipitated was separated by filtration and dried. The infrared absorption spectrum and the $B^{11}$ n-m-r (nuclear-magnetic-resonance) spectrum of the solid indicated that it was a mixture of about 89–90% $Cs_2B_{10}H_{10}$ and 10–20% $Cs_2B_{12}H_{12}$. The $B_{10}H_{10}^=$ and $B_{12}H_{12}^=$ anions can be separated in any of a number of ways. For example, the mixture of cesium salts can be dissolved in water to give a dilute aqueous solution. $B_{12}H_{12}^=$ is removed from the solution by addition of triethylammonium chloride, which precipitates the highly insoluble $[(C_2H_5)_3NH]_2B_{12}H_{12}$. The latter is removed by filtration. On evaporation of the filtrate to a low volume, the relatively soluble $Cs_2B_{10}H_{10}$ crystallizes from solution. The cesium cation in this compound can be exchanged for an extremely wide variety of other cations by conventional exchange-reaction techniques, including in particular the use of cation-exchange resins.

By the method of Example 1, with routine variations as required, other metal aluminum hydrides and Lewis bases can be reacted with diborane to produce the $B_{10}H_{10}^=$ anion. Examples are shown in the following table:

| Metal aluminum hydride | Lewis base |
|---|---|
| $NaAlH_4$ | $(C_5H_9)_3N$ ($C_5H_9$=cyclopentyl) |
| $Ba(AlH_4)_2$ | $(CH_3)_3P$ |
| $Mg(AlH_4)_2$ | $(C_2H_5)_2S$ |
| $RbAlH_4$ | $C_6H_5CH_2$—S-i-$C_4H_9$ |
| $KAlH_4$ | $[2,4,6-(CH_3)_3C_6H_2]_3P$ |
| $Sr(AlH_4)_2$ | $(C_7H_{15})_3P$ |
| $CsAlH_4$ | $C_6H_5CH_2N(CH_3)_2$ |
| $Be(AlH_4)_2$ | $\begin{array}{c} CH_2\text{—}CH_2 \\ \phantom{CH_2}\diagdown \\ \phantom{CH_2\text{—}}N\text{-n-}C_{12}H_{25} \\ \phantom{CH_2}\diagup \\ CH_2\text{—}CH_2 \end{array}$ |
| $Ca(AlH_4)_2$ | $\beta\text{-}C_{10}H_7CH_2CH_2N(C_3H_7)_2$ |

EXAMPLE 2

By the method of Example 1, a shaker tube was charged with 2.4 g. of aluminum chloride, 2.3 g. of sodium borohydride, 9.3 g. of triethylamine, and, at −60° C., 5.1 g. of diborane. The shaker tube was then heated at 180° C. and autogenous pressure with shaking for eight hours, cooled, and opened. The product mixture was poured onto ice, and the mixture of solid and liquid thus obtained was separated by filtration. Addition of aqueous cesium fluoride to the filtrate caused precipitation of a mixture of $Cs_2B_{10}H_{10}$ and $Cs_2B_{12}H_{12}$ as in Example 1.

In place of the aluminum chloride, sodium borohydride, and triethylamine of Example 2, the following combinations of reactants can be used to produce $B_{10}H_{10}^=$: aluminum bromide, lithium aluminum hydride, and tripropylphosphine; aluminum bromide, calcium aluminum hydride, and dimethyl sulfide; and aluminum iodide, potassium aluminum hydride, and tripentylphosphine.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing $B_{10}H_{10}^=$ anions which comprises reacting diborane, at a temperature in the range between about 140° C. to about 200° C., with a hydride selected from the class consisting of alkali-metal aluminum hydrides and alkaline-earth-metal aluminum hydrides, in the presence of a Lewis base selected from the class consisting of trihydrocarbylamines in which at most only one hydrocarbyl group is aryl, trihydrocarbylphosphines, and dihydrocarbyl sulfides, said Lewis bases being free of aliphatic unsaturation, said hydrocarbyl groups each containing from 1 to 12 carbon atoms, and recovering a compound containing the $B_{10}H_{10}^=$ anion.

2. The process of claim 1 wherein the hydride is an alkali-metal aluminum hydride and the Lewis base is of the formula $R_3N$ wherein each R is an aliphatically saturated hydrocarbyl group of at most 12 carbon atoms, and wherein any two of the R groups can be joined together to form a divalent aliphatically saturated hydrocarbyl group of at most 12 carbon atoms, and wherein at most only one of said hydrocarbyl groups is aryl.

3. The process of claim 2 wherein the R groups of the $R_3N$ Lewis base are each lower alkyl.

4. The process of claim 1 wherein the hydride is an alkali-metal aluminum hydride and the Lewis base is of the formula $R_3P$ wherein each R is an aliphatically saturated hydrocarbyl group of at most 12 carbon atoms and wherein two of said hydrocarbyl groups may be joined to form a divalent aliphatically saturated hydrocarbyl group of at most 12 carbon atoms.

5. The process of claim 1 wherein the hydride is an alkali-metal aluminum hydride and the Lewis base is of the formula $R_2S$ wherein each R is an aliphatically saturated hydrocarbyl group of at most 12 carbon atoms and wherein the two hydrocarbyl groups may be joined together to form a divalent aliphatically saturated hydrocarbyl group of at most 12 carbon atoms.

6. The process of claim 1 wherein the hydride is lithium aluminum hydride and the Lewis base is triethylamine.

7. In the process of claim 1, the step which comprises forming the hydride in situ by adding aluminum halide wherein the halide is of the group consisting of chloride, bromide and iodide and a borohydride whose cation is of the class consisting of alkali metals and alkaline earth metals, to the reaction mixture.

References Cited

FOREIGN PATENTS 840,572  7/1960  Great Britain.

OSCAR R. VERTIZ, Primary Examiner

G. O. PETERS, Assistant Examiner

U.S. Cl. X.R.

23—363; 260—606.5